US009436927B2

(12) United States Patent
Saliba et al.

(10) Patent No.: US 9,436,927 B2
(45) Date of Patent: Sep. 6, 2016

(54) WEB-BASED MULTIUSER COLLABORATION

(75) Inventors: Hani Saliba, Seattle, WA (US); Peter Engrav, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1075 days.

(21) Appl. No.: 12/048,615

(22) Filed: Mar. 14, 2008

(65) Prior Publication Data

US 2009/0235181 A1     Sep. 17, 2009

(51) Int. Cl.
| | | |
|---|---|---|
| *G06F 3/00* | (2006.01) | |
| *G06Q 10/10* | (2012.01) | |
| *G06F 17/22* | (2006.01) | |
| *G06F 17/24* | (2006.01) | |

(52) U.S. Cl.
CPC ........... *G06Q 10/10* (2013.01); *G06F 17/2288* (2013.01); *G06F 17/24* (2013.01)

(58) Field of Classification Search
CPC .............. G06F 17/2288; G06F 17/24; G06F 21/6218; G06F 17/212; G06F 17/30011; G06F 17/30607; G06F 17/30905; Y10S 707/99943
USPC ........................................................ 715/753
See application file for complete search history.

(56) References Cited

U.S. PATENT DOCUMENTS

| | | | |
|---|---|---|---|
| 5,671,428 A | 9/1997 | Muranaga et al. | |
| 5,890,177 A | 3/1999 | Moody et al. | |
| 6,189,009 B1 | 2/2001 | Stratigos et al. | |
| 6,233,600 B1 | 5/2001 | Salas et al. | |
| 6,662,209 B2 | 12/2003 | Potts et al. | |
| 6,907,565 B1 | 6/2005 | Huang | |
| 7,171,618 B2 * | 1/2007 | Harrington et al. | .......... 715/229 |
| 7,233,951 B1 * | 6/2007 | Gainer et al. | |
| 7,249,314 B2 | 7/2007 | Walker et al. | |
| 2002/0065848 A1 * | 5/2002 | Walker | .................... G06F 17/24 715/205 |
| 2002/0107994 A1 | 8/2002 | Rickards, III | |

(Continued)

FOREIGN PATENT DOCUMENTS

| | | | |
|---|---|---|---|
| JP | 2002-140323 A | 5/2002 | |
| JP | 2003-281101 A | 10/2003 | |

(Continued)

OTHER PUBLICATIONS

"International Search Report", dated Sep. 14, 2009 in Application No. PCT/US2009/032560, pp. 1-11.

(Continued)

*Primary Examiner* — Amy Ng
*Assistant Examiner* — Andres E Gutierrez
(74) *Attorney, Agent, or Firm* — Steve Crocker; Danielle Johnston-Holmes; Micky Minhas

(57) ABSTRACT

Tools and techniques are described for web-based multiuser collaboration. These tools may provide methods that enable users to collaborate remotely on documents using respective browsers. These methods may send representations of portions of a given document to the browsers, and associate portions of the documents with particular users. The browsers may receive representations of commands as provided by the users, and may determine whether to execute the commands at the browser. The methods may also include receiving from the browsers revisions to the portions of the document, and storing these portions of the document in storage areas that are configured for storing content that has changed relatively recently.

20 Claims, 9 Drawing Sheets

(56) References Cited

U.S. PATENT DOCUMENTS

| | | | |
|---|---|---|---|
| 2003/0105734 A1* | 6/2003 | Hitchen et al. | 707/1 |
| 2003/0105816 A1 | 6/2003 | Goswami | |
| 2003/0233621 A1 | 12/2003 | Paolini et al. | |
| 2004/0205541 A1* | 10/2004 | D'Amico | 715/512 |
| 2005/0044145 A1* | 2/2005 | Quinn et al. | 709/205 |
| 2006/0117249 A1 | 6/2006 | Hu et al. | |
| 2007/0186171 A1 | 8/2007 | Junuzovic et al. | |
| 2007/0291297 A1* | 12/2007 | Harmon et al. | 358/1.15 |
| 2008/0059539 A1* | 3/2008 | Chin | G06Q 10/10 |
| 2008/0163102 A1* | 7/2008 | Horiuchi | 715/781 |
| 2009/0106286 A1* | 4/2009 | Chakraborty et al. | 707/101 |
| 2009/0217175 A1* | 8/2009 | Bechtel et al. | 715/751 |

FOREIGN PATENT DOCUMENTS

| | | |
|---|---|---|
| JP | 2005-018791 A | 1/2005 |
| RU | 2 250 492 C2 | 4/2005 |
| WO | WO2007082166 A2 | 7/2007 |

OTHER PUBLICATIONS

Dobrowolski, "MoonEdit", Tom Dobrowolski, 2003-2005, pp. 2.

Fraser, "MobWrite", 1.

Shen, et al., "Recipe: A Web-based Environment for Supporting Realtime Collaborative Programming", ACTA Press, 2007, p. 1.

Dobrowolski, Tom "MoonEdit," downloaded Oct. 22, 2007 from http://me.sphere.pl/indexen.htm, 2 pages.

Fraser, Neil, "MobWrite", Oct. 15, 2007, downloaded from http://neil.fraser.name/software/mobwrite/, 1 page.

Preston et al. , "An Efficient Synchronous Collaborative Editing System Employing Dynamic Locking of Varying Granularity in Generalized Document Trees" Nov. 2006, IEEE Intl Conference on Collaborative Computing: Networking, Applications and Worksharing, 10pp.

European Search Report dated Dec. 4, 2012 in European Application No. 09720207.1.

Chinese Official Action dated Feb. 22, 2012 in Chinese Application No. 200980109416.4.

Japanese Official Action dated Jan. 29, 2013 in Japanese Application No. 2010-550713.

Russian Official Action dated Jan. 28, 2013 in Russian Application No. 2010137977.

Mexican Official Office Action dated Apr. 19, 2013 in Mexican Application No. MX/a/2010/009893.

Russian Notice of Allowance dated Aug. 22, 2013 in Russian Application No. 2010137977/08(054128).

Chinese Official Action dated Nov. 5, 2012 in Chinese Application No. 200980109416.4.

Australian Official Action dated Jan. 8, 2014 in Australian Application No. 2009223346.

Israeli Official Action dated Sep. 16, 2013 in Israeli Application No. 207620.

Australian Notice of Allowance dated Feb. 11, 2014 in Australian Patent Application No. 2009223346.

Japanese Official Action dated Mar. 13, 2014 in Japanese Application No. 2010-550713.

The Korean Office Action mailed Mar. 23, 2015 for Korean patent application No. 10-2010-7022864, 5, a counterpart foreion application of U.S. Appl. No. 12/048,615, 5 pages.

First Office Action Issued in Malaysian Patent Application No. PI 2010004119, Mailed Date: Jan. 15, 2015, 3 Pages.

Translated Chinese Office Action mailed May 27, 2015 for Chinese patent application No. 200980109416.4, a counterpart foreign application of U.S. Appl. No. 12/048,615, 8 pages.

Office Action Issued in Canadian Patent Application No. 2717347, Mailed Date: Aug. 6, 2015, 3 Pages.

* cited by examiner

WEB-BASED MULTIUSER COLLABORATION

BACKGROUND

For a variety of reasons, differing users who are geographically separated from one another may wish to collaborate on documents. Previous techniques for facilitating this type of remote collaboration typically involve having these different users install a suitable richly-featured client on remote workstations.

SUMMARY

Tools and techniques are described for web-based multiuser collaboration. These tools may provide methods that enable users to collaborate remotely on documents using respective browsers. These methods may send representations of portions of a given document to the browsers, and associate portions of the documents with particular users. The browsers may receive representations of commands as provided by the users, and may determine whether to execute the commands at the browser. The methods may also include receiving from the browsers revisions to the portions of the document, and storing these portions of the document in storage areas that are configured for storing content that has changed relatively recently.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
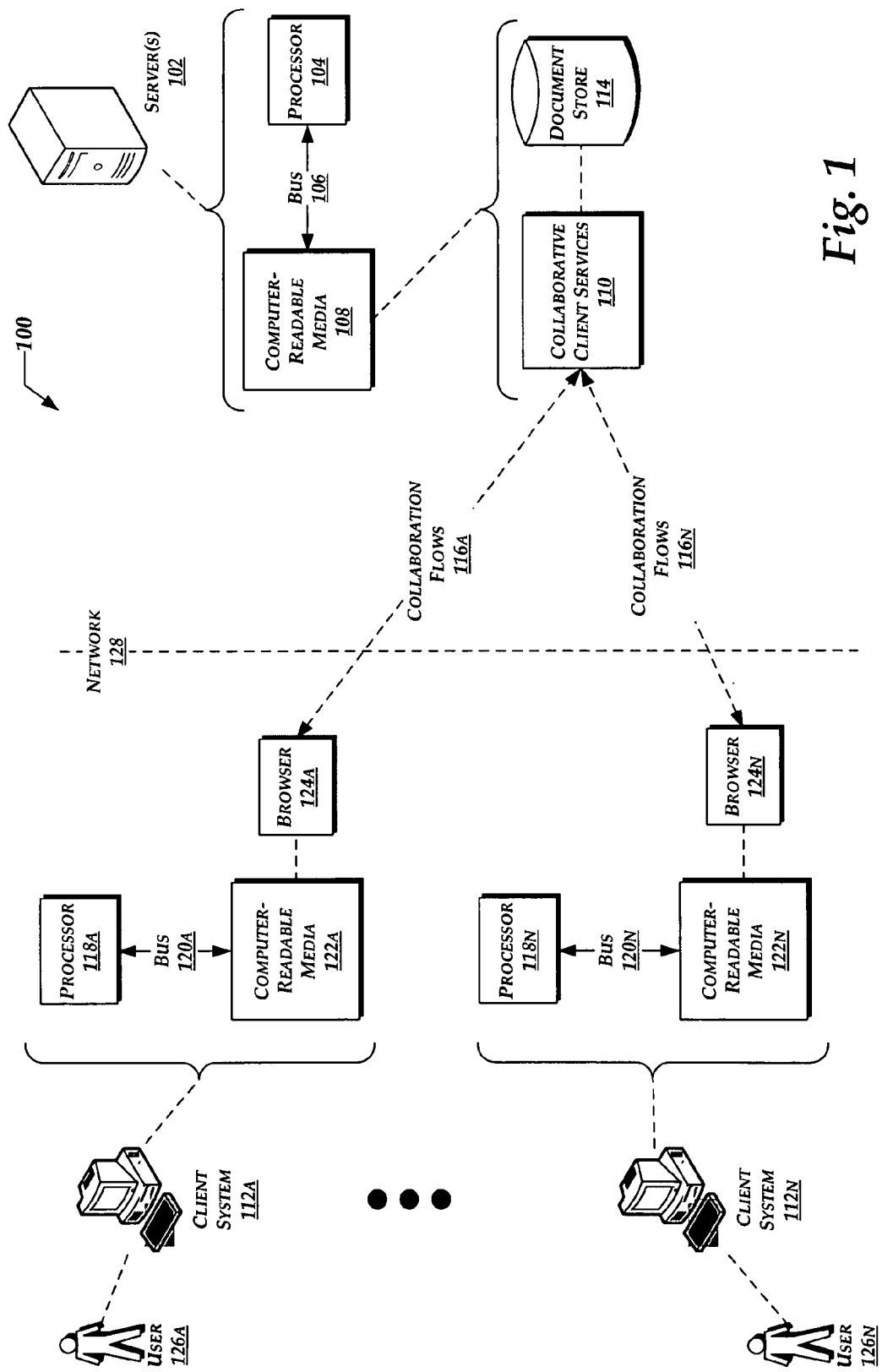
FIG. 1 is a combined block and flow diagram illustrating systems or operating environments for providing web-based multiuser collaboration.

The following detailed description is directed to technologies for web-based multiuser collaboration. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including handheld devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for multi-client collaboration to access and update structured data elements will be described.

FIG. 1 illustrates systems or operating environments, denoted generally at 100, for providing web-based multiuser collaboration. These systems 100 may include one or more server systems 102, with implementations of this description including any number of front-end and/or back-end servers as described in further detail below. The servers may include one or more processors 104, which may have a particular type or architecture, chosen as appropriate for particular implementations. The processors 104 may couple to one or more bus systems 106 chosen for compatibility with the processors 104.

The servers 102 may also include one or more instances of computer-readable storage media 108, which couple to the bus systems 106. The bus systems may enable the processors 104 to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more modules of instructions that, when loaded into the processor 104 and executed, cause the server 102 to perform various techniques for facilitating web-based multiuser collaboration. More specifically, the storage media 108 may include modules of instructions that provide collaborative client services 110 to a plurality of client systems. FIG. 1 provides two examples of such client systems at 112*a* and 112*n* (collectively, client systems 112). However, implementations of this description may include a number of client systems.

The storage media 108 may contain one or more instances of a document store 114. While further details of the document store are provided below, in overview, the document store houses or contains documents on which a plurality of client systems may collaboratively edit or create. Although FIG. 1 illustrates a scenario in which the document store 114 and the software for the collaborative client services 110 reside on the same storage media 108, this example is provided only for ease of illustration, but not to limit possible implementations. It is specifically noted that in some scenarios, the document store and the collaborative client services may reside on separate media, and/or on separate systems or physical boxes.

Turning to the collaborative client services 110 in more detail, these services may facilitate collaboration flows between the servers 102 any client systems 112. FIG. 1 provides two examples of collaboration flows, with collaboration flows 116a representing data and process flows between the server 102 and the client system 112a, and collaboration flows 116 and representing data and process flows between a server 102 and the client system 112n.

Turning to the client systems 112 in more detail, these client systems may include respective processors 118a and 118n (collectively, processors 118), which may or may not be of the same type and architecture as the processor 104. Bus systems 120a and 120n (collectively, by systems 120) may couple respectively to the processors 118a and 118n, as shown in FIG. 1. These bus systems 120 may be compatible in type and architecture with their corresponding processors 118, and may or may not be the same type and architecture as the bus systems 106 on the server 102. Respective instances of computer-readable storage media 122a and 122n (collectively, storage media 122) may contain browser software 124a and 124n (collectively, browsers 124).

The client systems 112 and the server systems 102 may cooperate as described herein to enable respective end-users 126a and 126n (collectively, end-users 126) to collaborate on editing and/or creating documents (in whole or in part) from the document store 114. In some scenarios, different end users 126 may collaboratively edit the same portion of a given document. In other scenarios, different end users 126 may elaborate on different portions of the given document.

The server systems 102 and the various client systems 112 may communicate with one another over one or more suitable networks, represented generally at 128. Such networks 128 may take any suitable form, whether characterized as global, regional, local, personal, or other types of networks. The server systems and client systems may include any network adapters, hardware, software, protocol stacks, or the like as appropriate to interface with the networks 128, although these features are omitted from FIG. 1 in the interests of clarity and brevity.

As described in further detail below, the collaborative client services 110 may enable the users 126 to collaborate in editing or creating at least portions of the documents using the browsers. Because the users 126 are able to use the browsers, client systems 112 may avoid installing additional client software to enable the users to dissipate in this collaborative experience. The collaborative client services 110 may provide the users 126 with a rich client experience through ubiquitous browsers. More specifically, the collaborative client services may enable the users to access various types of end-user functionality, including but not limited to, word processing, database management, spreadsheet management, data sharing, electronic notebook capabilities, or the like. To enable these user experiences, the collaborative client services at the server end may convert to/from any native formats used by feature-rich clients that perform any of the foregoing functions.

The graphical elements used in FIG. 1 to depict the server and client systems are chosen only to facilitate illustration, and not to limit possible implementations of the description herein. More particularly, FIG. 1 shows examples in which the server system 102 is a centralized computing system, possibly shared by more than one client system. The client systems 112 may represent desktop systems, laptop or mobile computing systems, smart phones, wireless-enabled personal digital assistants (PDAs), or other suitable systems. However, the description herein also contemplates other forms of server and/or client systems, including but not limited to, those examples shown in FIG. 1.

Having described the systems and operating environments shown in FIG. 1, the discussion now proceeds to a description of components and flows related to initiating the collaboration process. This discussion is now presented with FIG. 2.

Figure 2:
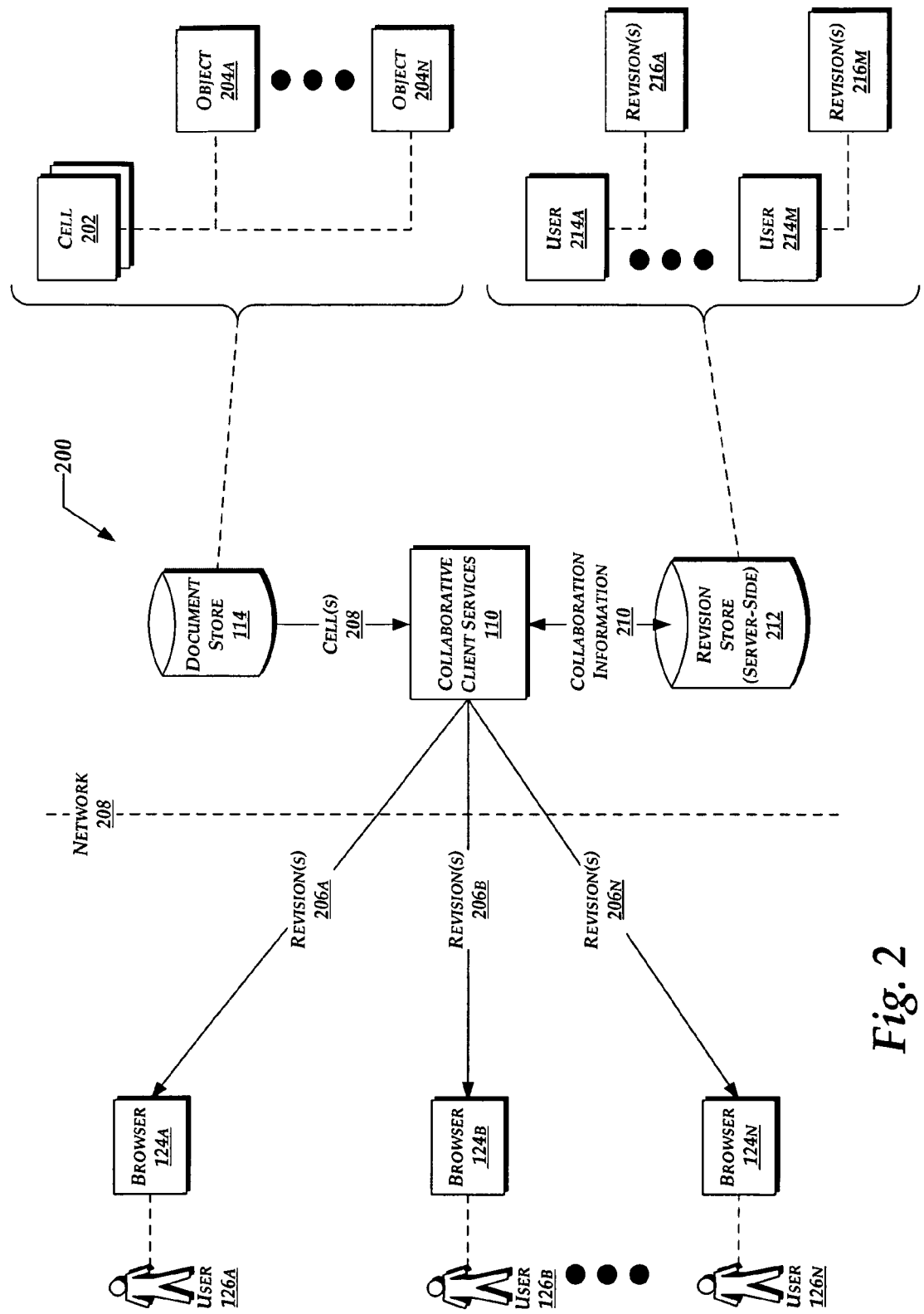
FIG. 2 is a combined block and flow diagram illustrating components and data flows related to initiating collaboration processes as shown in FIG. 1.

FIG. 2 illustrates components and data flows, denoted generally at 200, related to initiating the collaboration processes as shown in FIG. 1. For ease of reference, and not limitation, FIG. 2 may carry forward some reference numbers from previous drawings to refer to similar items. For example, FIG. 2 carries forward a representation of the collaborative client services 110, the document store 114, the network 128, the browsers 124, and the users 126 from FIG. 1.

Turning in more detail to the document store 114, the document store may implement models of documents that are available for collaboration by the client systems and end-users. More specifically, these models may facilitate increased efficiencies and optimizations during these collaboration efforts. For example, models of particular documents may assign particular semantic pieces of the documents to constructs referred to herein as cells. In addition, another construct described herein is a revision, which is a snapshot of a cell taken at a specific time, providing a representation of the cell at that point in time. For example, respective pages within a given document may be represented using particular cells. In turn, particular revisions may be subdivided into one or more objects that represent particular portions or aspects of the content corresponding to the cell. For example, objects may include paragraphs or images appearing within a given page, bullet points appearing within a given list, or the like.

FIG. 2 illustrates examples of revision structures at 202, with the understanding that implementations may include any number of cell structures as appropriate to represent one or more documents. In turn, a given revision structure may include one or more objects, with FIG. 2 illustrating examples of objects at 204a and 204n (collectively, objects 204). Particular objects may be identified by corresponding IDs. These objects may point to other objects within the same cell, or may point to objects in other cells.

The collaborative client services 110 may send one or more revisions from a given particular document for collaboration by different end users 126 via browsers 124. For example, the collaborative client services 110 may determine which revisions within the given document are of interest to different end users, and may then send those revisions for display on browsers to those end users. FIG. 2 denotes at 206a examples of revisions sent to the browser 124a for interaction by the user 126a, denotes at 206b examples of revisions sent to the browser 124b for interaction by the user 126b, and denotes at 206n examples of revisions sent to the browser 124n for interaction by the user 126n.

The collaborative client services 110 may determine which particular revisions 206 of a given document are to be distributed to the various client browsers. For example, the collaborative client services may initially send to the browsers a navigation page containing the names of all the pages within a given document, along with the content of only the first page. At the browsers, the different users may then click on their respective navigation pages, and choose which pages they would like to see and edit. The collaborative client services may then download the contents of the selected pages to the various browsers. For example, different users 126 may scroll to the same or different pages in the given document. In this example, once the collaborative client services determines the pages that different users wish to edit, the client services may obtain from the document store 114 those revisions 208 that correspond to these pages. In turn, the collaborative client services may distribute these revisions to the appropriate users, as represented at 206a, 206b, and 206n (collectively, distributed revisions 206).

In different scenarios, the collaborative client services may distribute not only a given page being edited by a particular user, but may also distribute a certain number of pages occurring before and/or after the given page within the document. By providing a certain number of "look-ahead" or "look-behind" pages, the collaborative client services may enable these users to scroll through several consecutive pages without being sent additional revisions.

As described in further detail below, the cell model may allow the document store to facilitate more efficient collaboration between the different end users (e.g., 126). For example, the revision representations of the documents are typically much smaller than the documents as a whole.

As described in further detail below, the cell model of documents may allow the document store to facilitate more efficient collaboration between the different end users (e.g., 126). For example, the revision-based representations of the documents are typically much smaller than the documents as a whole. Thus, the collaborative client services may reduce consumption of network resources and conserve network bandwidth by sending these revision representations, as compared to sending the entire documents to the different collaborating users and client systems.

Once the collaborative client services have distributed particular revisions 206 to the browsers, these services may store collaboration information, denoted generally at 210. For example, this collaboration information may indicate which particular revisions have been distributed to which particular users. The collaborative client services may store this information in a server-side revision store 212, which may contain representations 214a and 214m of different users 126 (collectively, user representations 214). In turn, the user representations 214 may indicate which revisions have been distributed to particular users, as indicated at 216a and 216m (collectively, revision representations 216) as described in further detail below, these entries in the server-side revision store may enable the collaborative client services to determine which revisions made by particular users may be relevant to other users.

Having described the components and flows related to initiating collaboration between various client systems and users in FIG. 2, the discussion now proceeds to a description of process flows performed to initiate collaborative efforts for a particular document. This description is now provided with FIG. 3

Figure 3:
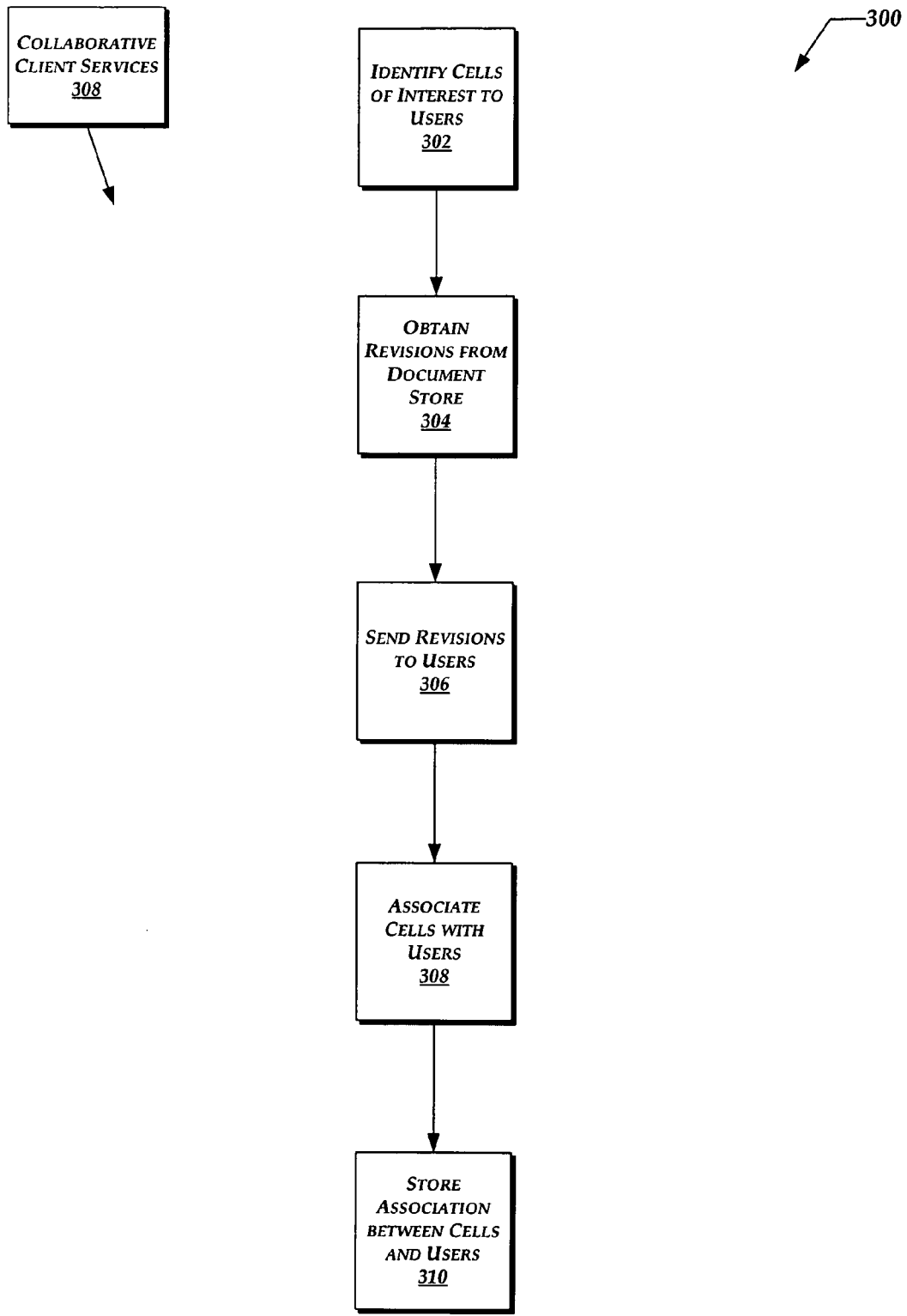
FIG. 3 is a flow diagram illustrating processes for initiating collaborative efforts (e.g., editing) for a particular document.

FIG. 3 illustrates process flows, denoted generally at 300, for initiating collaborative efforts (e.g., editing) for a particular document. For ease of reference, and not limitation, FIG. 3 may carry forward some reference numbers from previous drawings to refer to similar items. For example, FIG. 3 carries forward from previous drawings the representation of the collaborative client services 110. While the process flows 300 are described in connection with these collaborative client services, it is noted that implementations of the process flows 300 may also be performed by other components or services without departing from the scope and spirit of this description.

Turning to the process flows 300 more detail, block 302 generally represents identifying which cells within a given document that are of interest to one or more particular users. For example, block 302 may include sending the names of the pages of the given document to a plurality of collaborating users, along with the content of the first page in the document. The users may then select the names of the pages that they wish to see. Block 302 may include providing some level of look-ahead and/or look-behind with respect to a given cell of interest to a particular user. Recalling the above discussion of the cell model of documents, particular cells may represent pages within these documents, for example.

Block 304 generally represents obtaining the revisions of interest identified in block 302. For example, block 304 may include obtaining the revisions of interest from a document store containing content on which a variety of different users may collaborate using the tools and techniques described herein. FIG. 2 provides an example of such a document store at 114, and denotes examples of cells at 208.

Block 306 generally represents sending the obtained revisions of interest to particular users. For example, assuming that three different users are collaborating on a given document as shown in FIG. 2 (e.g., users 126a, 126b, and 126n), these users may exhibit interest in the same or different portions of this given document. Accordingly, block 306 may include sending revision representations of the appropriate portions of the given document to these different users (e.g., 206a, 206b, and 206n).

Block 308 generally represents associating particular users with the cells on which these users are operating. For example, block 308 may include associating representations of particular users (e.g., 214 in FIG. 2) with cells of which revisions have been provided to those users (e.g., revision representations 216 in FIG. 2).

Block 310 generally represents storing the associations defined in block 308. For example, block 310 may include updating a server-side revision store (e.g., 212) to store the associations or relationships between elaborating users and cells on which those users are collaborating, as denoted in FIG. 2 at 214 and 216.

Having described the process flows 300 for initiating collaboration efforts on a particular document, the discussion now proceeds to a more detailed description of components and flows that may occur on the browser side to initiate this collaboration. This discussion is now presented with FIG. 4.

Figure 4:
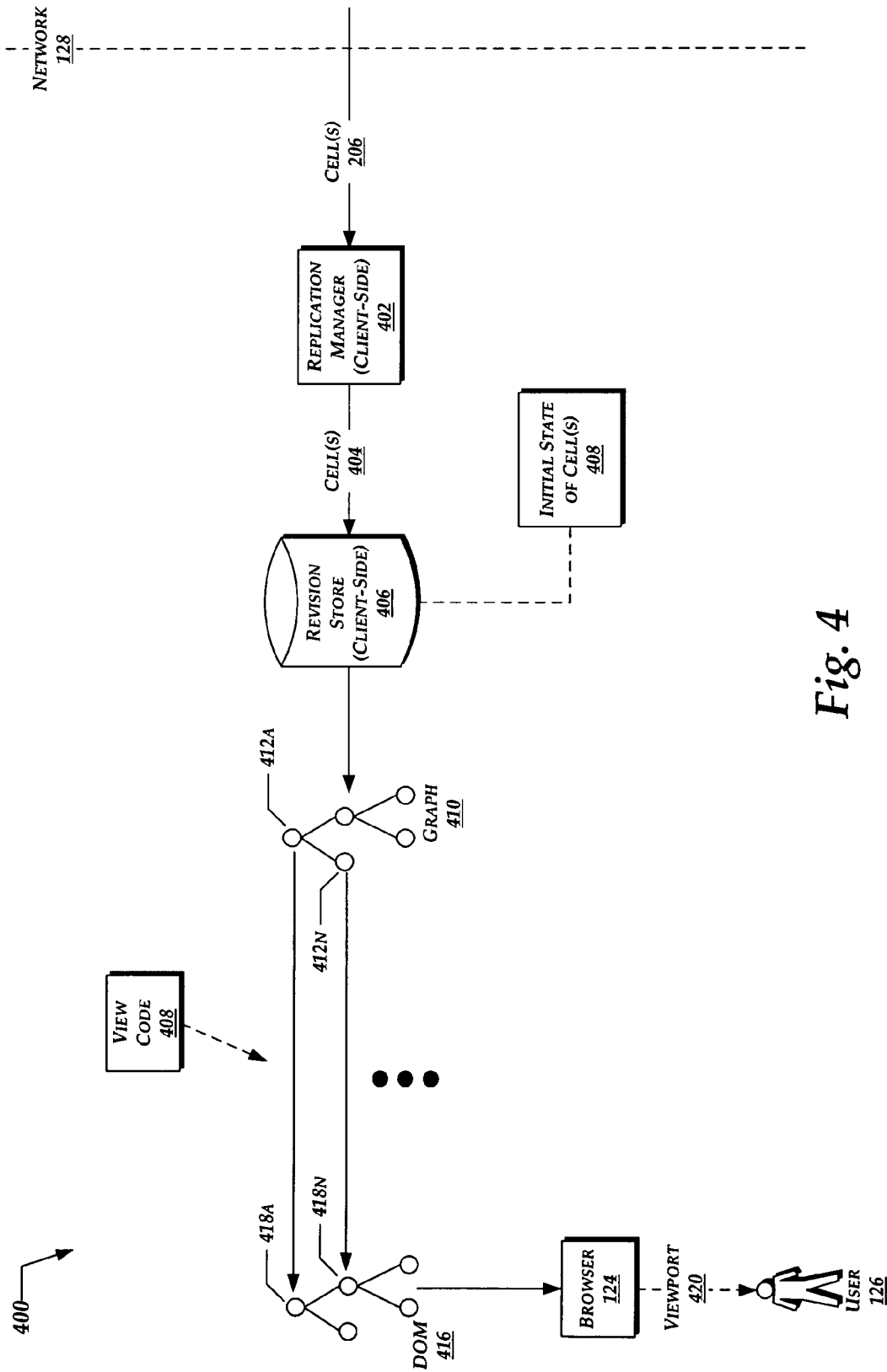
FIG. 4 is a combined block and flow diagram illustrating components and flows for initiating collaboration at a given browser.

FIG. 4 illustrates components and flows, denoted generally at 400, that may occur on the browser side to initiate collaboration at a given client system. For ease of reference, and not limitation, FIG. 4 may carry forward some reference numbers from previous drawings to refer to similar items. For example, FIG. 4 carries forward from previous drawings the network 128, the distributed cells 206, the browser 124, and the user 126.

Turning to FIG. 4 in more detail, a client side replication manager 402 may receive the distributed revisions 206 from the server 102 over the network 128. These revision 206 may represent pages presented initially to the user 126, or may represent revisions made to these cells by other collaborating users. For the purposes of describing FIG. 4, it is assumed that the cells 206 represent pages presented initially to the user 126 through the browser 124.

In general, the replication manager 402 may upload and download revisions to cells between the browser and the server. The replication manager may also transform protocols as appropriate between the network and the browser. In FIG. 4, the revisions as denoted at 206 are assumed to be in a protocol suitable for network transmission, while the revisions as denoted at 404 are transformed as suitable for processing by the browser.

The replication manager 402 may forward the revisions 404 to a client-side revision store 406. In general, the revision store may manage and store revisions (or changes to those revisions) that occur to the cells 206, whether these revisions or changes occur locally at the given browser 124, or occur remotely at other browsers and are reported into the given local browser 124. When beginning a given collaborative effort relating to the revisions 404, the revision store 406 may store an initial state or revision of these cells 408 for future reference.

The revision store 406 may provide a representation of the cells to a graph data structure 410, which provides a semantic model of the document being collaboratively edited, with this semantic model providing a hierarchy for the document. Assuming implementation of a data/view model, the graph structure 410 may provide the data portion of this model. The graph structure 410 may be a directed acyclic graph including different types of nodes, property sets, and other elements representing the incoming cells 206. FIG. 4 denotes examples of nodes at 412a and 412n (collectively, graph nodes 412) For example, assuming that an incoming revision represents a page of the collaboratively edited document, different nodes 412 within the graph structure 410 may represent different paragraphs, images, pages, sections, or other portions or sub-elements within the page. Some objects may be represented with one node in the graph (e.g., an image), while other content, such as tables, may be represented with many nodes in the graph.

In illustrative but non-limiting implementations, the client-side replication manager 402, the client-side revision store 406, the initial cell state 408, and the graph structure 410 may be authored in Script# and implemented in JavaScript. However, these examples are provided to facilitate this description only, and other scenarios may be possible in different implementations.

The graph structure 410 may provide a browser-independent model of the content represented by the incoming revisions 206. In turn, the nodes 412 within this graph structure may be rendered in any one of a variety of different partially-available browsers. Accordingly, a view model or view code 414 may render or map these nodes 412 from the graph structure 410 to a browser-dependent viewing model. FIG. 4 provides an example of such a viewing model as a document object model (DOM) 416. The DOM 416 may store a current view of the collaboratively edited document, representing paragraphs, images, lists, or other elements appearing within one or more pages of the document.

The view code 414 may create the DOM from the graph structure 410, with nodes 412a and 412n in the graph structure corresponding to nodes 418a and 418n (collectively, DOM nodes 418) in the DOM. The DOM 416 may then be rendered on the browser 124 for viewing by the user 126. FIG. 4 denotes that portion of the rendered content as viewable by the user at any given time as a browser viewport 420. The user may then interact, as he or she sees fit, with whichever elements are represented in the browser viewport.

Having described the components and flows for initiating collaboration efforts on particular documents in FIG. 4, the discussion now turns to a description of opponents and flows for processing revisions made to the documents by collaborating users. This description is now provided with FIG. 5.

Figure 5:
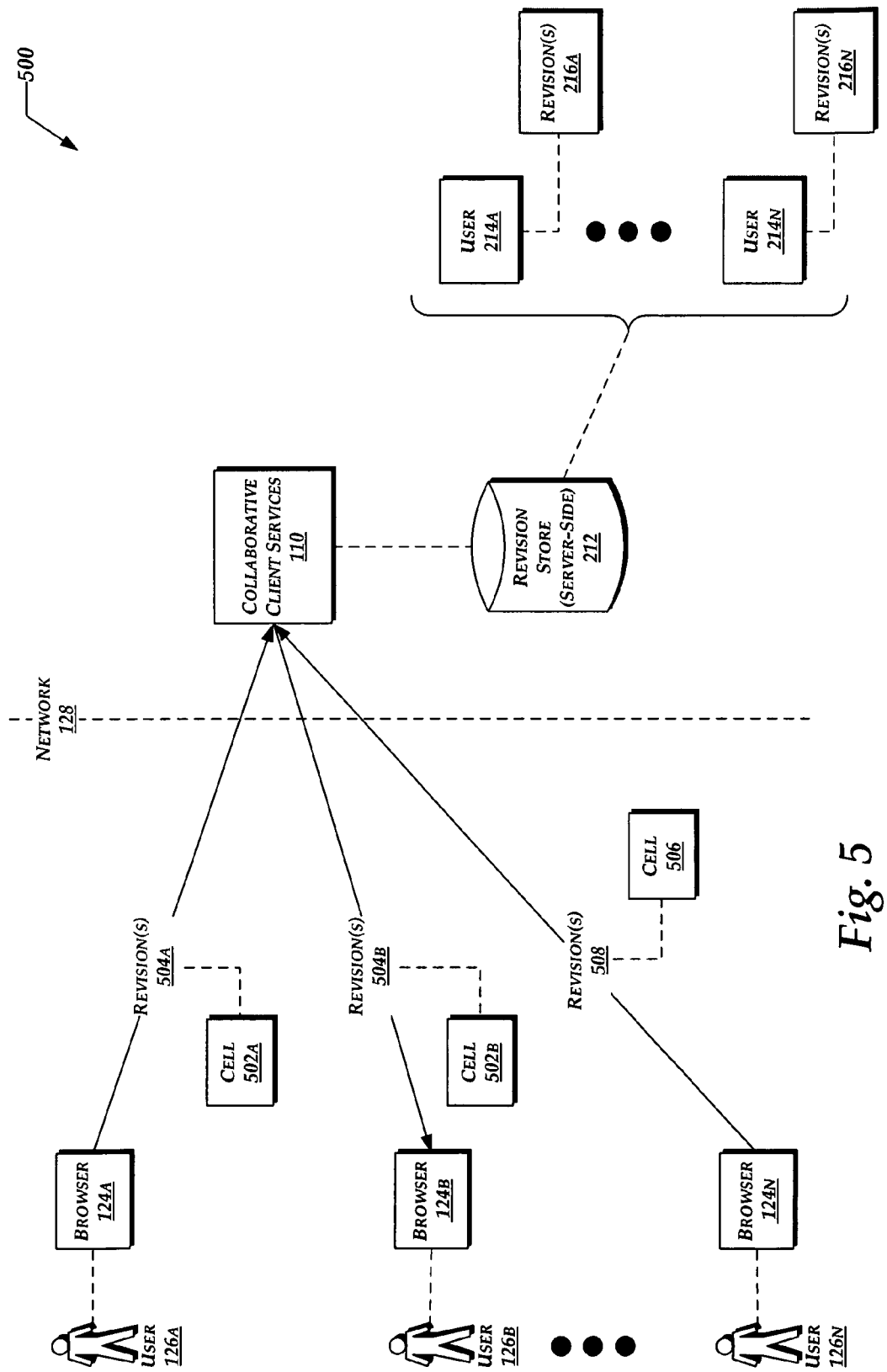
FIG. 5 is a combined block and flow diagram illustrating components and flows for processing revisions made to documents by collaborating users.

FIG. 5 illustrates components and flows, noted generally at 500, for processing revisions made to the documents by collaborating users. For ease of reference, and not limitation, FIG. 5 may carry forward some reference numbers from previous drawings to refer to similar items. For example, FIG. 5 carries forward from previous drawings the network 128, the browsers 124, the users 126, the collaborative client services 110, the server-side revision store 212, and related representations of users 214 and revisions 216.

Turning to FIG. 5 in more detail, assume that the users 126a and 126b are collaborating on the same cell within a given document. FIG. 5 denotes at 502a and 502b this cell as shared between the users 126a and 126b. As described above, the server-side revision store 212 may create and store user representations 214 and revision representations 216 to indicate this scenario. If the user 126a creates revisions 504a to the shared cell 502a, the browser 124a may send these revisions to the collaborative client services 110. The notification of the revisions 504a may also indicate the cell 502a that was revised.

Having received notification of the revisions 504a, the collaborative client services 110 may determine whether these revisions 504a are relevant to the cells being edited by other users. To make this determination, the collaborative client services 110 may query the server-side revision store 212 to determine whether any other users are editing the cell 502a. In this case, this query would indicate that the user 126b is also editing the cell 502a that was just revised. In addition, the browser 124b may query the collaborative client services 110 for any new changes to the cell 502. In this manner, a server running the collaborative client services may implicitly determine that two clients are collaborating on the cell 502. Accordingly, in some scenarios, the collaborative client services 110 may formulate and send a notification of these revisions to the browser 124b. In other scenarios, the collaborative client services may receive requests from the browser 124b, and may respond to such requests with the appropriate revisions for the cell 502. FIG. 5 represents these and other scenarios generally at 504b. In turn, the browser 124b may update its display to incorporate the revisions 504b.

In this scenario shown in FIG. 5, the user 126n is assumed to be editing a cell 506 that is different than the cell 502a and 502b (collectively, cell 502) shared by the users 126a and 126b. Although these different cells 502 and 506 may be within the same document, the user 126n is not currently editing the cell 502. In this scenario, revisions to this cell 502 made by other users are not of immediate relevance to the user 126n and/or browser 124n. Therefore, the collaborative client services 110 do not immediately notify the browser 124n of these revisions, thereby conserving the network bandwidth associated with such a notification. However, the user 126n may make revisions 508 to the cell 506, with these revisions being communicated to the collaborative client services 110 as appropriate. In turn, the collaborative client services may communicate these revisions to any other browsers or users who are editing the same cell 506.

As described above, the scenarios illustrated in FIG. 5 may offer operational efficiencies, as compared to previous techniques. For example, the collaborative client services may distribute portions of the documents (e.g., revisions), rather than the entire documents themselves. Typically, these revisions are much smaller than the entire documents. Thus, transmitting these revisions over the network consumes less network bandwidth, as compared to sending the entire documents. In addition, the browsers 124 and the collaborative client services 110 may exchange revisions to these portions of the documents, rather than exchanging updated versions of the entire documents. Therefore, communicating these revisions over the network involves transmitting much less data, as compared to exchanging updated versions of the entire documents. The network traffic that occurs under this model may be proportional to the size of the changes being communicated, but is not proportional to the size of the object being changed.

When various browsers 124 report revisions to the cells that are being collaboratively edited, the collaborative client services distribute indications of these revisions only to those other browsers that are editing the same cells. Generally, if a given document is modeled with multiple cells, and if multiple users are collaborating on this document, then these cells are typically randomly distributed among the multiple users. Thus, in a worst-case scenario, all of these users may be collaborating on the same cell, but in a best-case scenario, at most one user is operating on a given cell. Typical operational situations may fall somewhere between these two extremes, with the collaborative client services further conserving network bandwidth and resources by reporting revisions only to those users and browsers operating on the revised cell.

Having described the components and data flows related to processing revisions made to the documents by collaborating users in FIG. 5, the discussion now turns to a description of process flows for processing these revisions. This discussion is now presented with FIG. 6.

Figure 6:
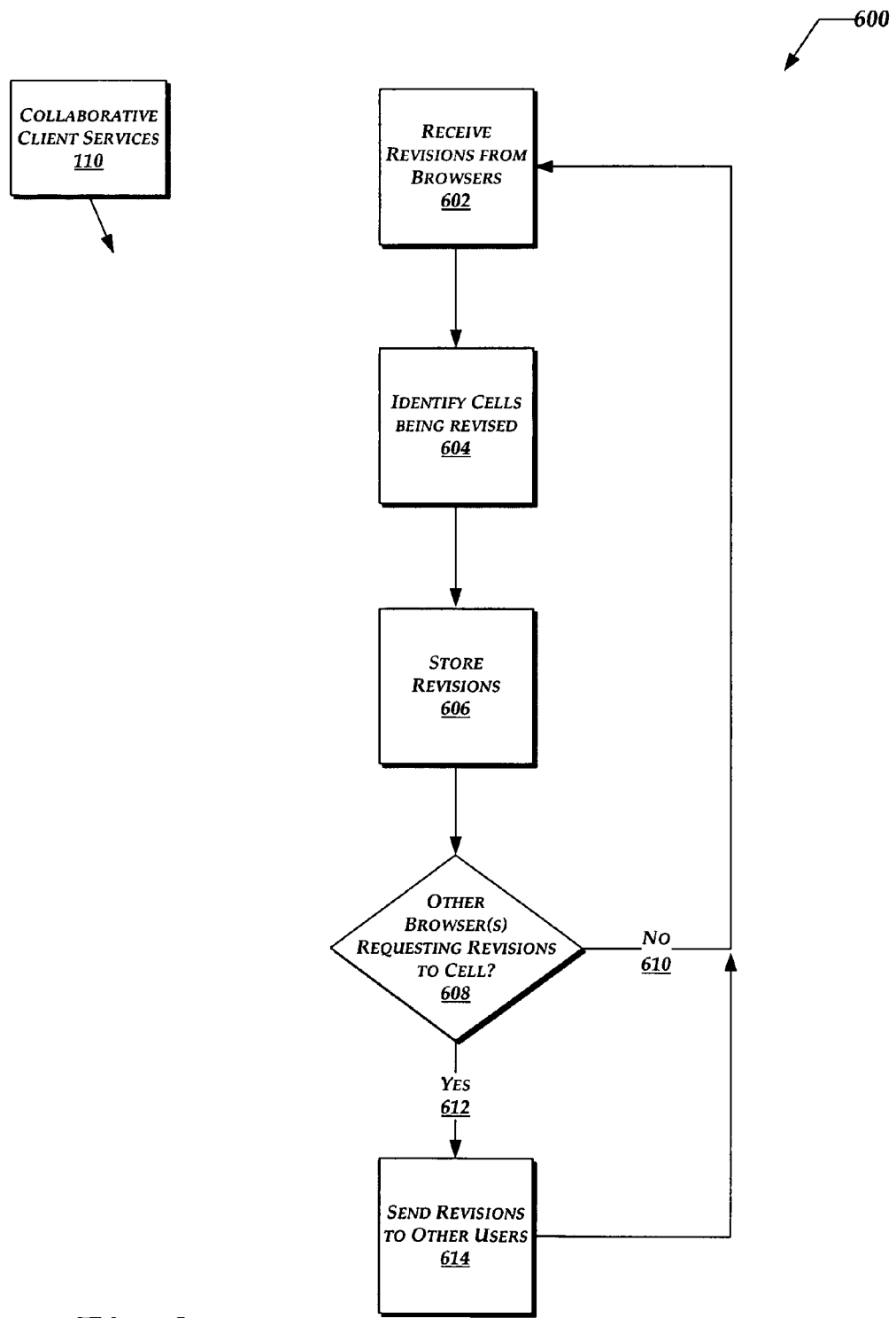
FIG. 6 is a flow diagram illustrating processes for handling revisions as reported by browsers.

FIG. 6 illustrates flows, denoted generally at 600, for processing revisions as reported by browsers. For ease of reference, and not limitation, FIG. 6 may carry forward some reference numbers from previous drawings to refer to similar items. For example, FIG. 6 carries forward from previous drawings the representation of the collaborative client services 110. While the process flows 600 are described in connection with these collaborative client services, it is noted that implementations of the process flows 600 may also be performed by other components or services without departing from the scope and spirit of this description.

Turning to FIG. 6 in more detail, block 602 represents receiving indications of revisions as reported by one or more browsers (e.g., 124 in previous drawings). For example, block 602 may include the collaborative client services 110 receiving indications of such revisions, as denoted in FIG. 5 at 504a and 508.

Block 604 generally represents identifying cells that are subject to the revisions reported in block 602. For example, the reported revisions may include an identifier indicating the cells modified by these revisions.

Block 606 generally represents storing the reported revisions as received in block 606. For example, block 606 may include storing these revisions in the server-side revision store (e.g., 212).

Decision block 608 represents determining whether any other browsers have requesting to see and/or edit a given cell that has been revised. If no other browsers are currently requesting the given cell at a given time, then the process flows 600 may take No branch 610 to return to block 602 and await notification of the next revision to the cell from one of the browsers.

Returning to decision block 608, if other browsers have requested the revised cell, the process flows 600 may take Yes branch 612 to block 614, which represents sending revisions to the cell to any requesting browsers. As described above in FIG. 5, the cells available for collaboration may be randomly distributed among the collaborating users. In this scenario, block 614 may include sending notifications of these updates to some smaller subset of the users collaborating within a given document, rather than to all of the users collaborating on the given document.

After performing block 614, the process flows 600 may return to block 602 to await the next notification of revisions from browsers. Having described the flows for processing revisions reported by various collaborating browsers in FIG. 6, the discussion now turns to a description of components and data flows occurring on the browser side to process these revisions. This description is now provided with FIG. 7.

Figure 7:
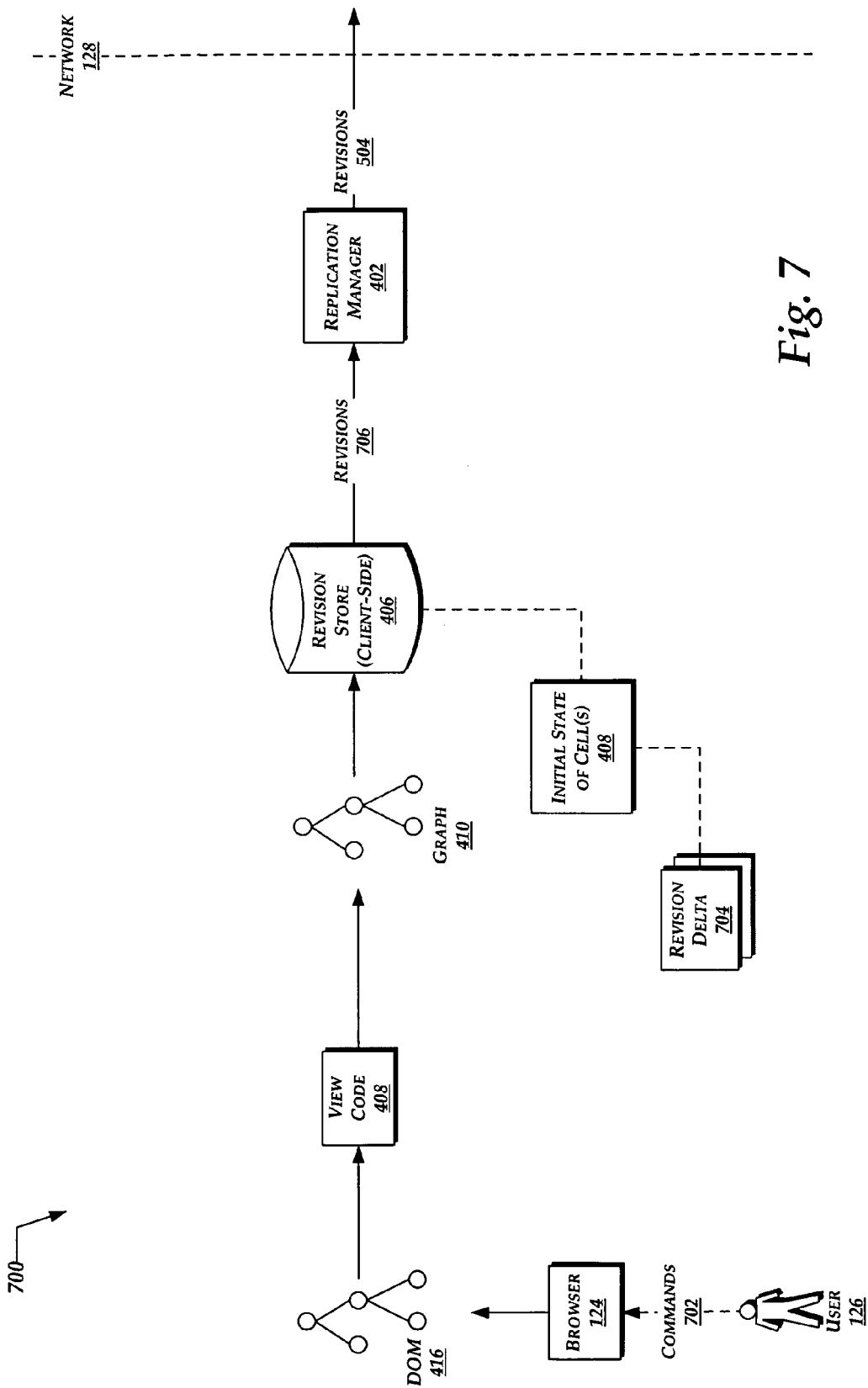
FIG. 7 is a combined block and flow diagram illustrating components and data flows that the browser may provide to process revisions to content that is collaboratively edited by a plurality of users.

FIG. 7 illustrates components and data flows, denoted generally at 700, that the browser may provide to process revisions to content that is collaboratively edited by a plurality of users. For ease of reference, and not limitation, FIG. 7 may carry forward some reference numbers from previous drawings to refer to similar items. For example, FIG. 7 carries forward from previous drawings the network 128, an example user 126, an example browser 124, an example DOM 416, an example view code or view model 408, and an example graph structure 410. FIG. 7 also carries forward the client-side revision store 406, which may include the initial state 408 of the cells displayed within the browser 124 for editing by the user 126. In addition, FIG. 7 carries forward the replication manager 402, which may report the revisions 504 from the browser over the network 128.

Turning to FIG. 7 in more detail, the user 126 may issue various commands sent out to interact with content presented in the browser 124, and may make any number of revisions to this content through these commands. These commands 702 may take various types, depending on the type of content presented in the browser, and depending on what capabilities are made available to the browser through the collaborative client services (e.g., 110 in previous drawings).

Depending on the type of commands 702 issued by the user, the browser may execute these commands against the DOM or against the graph structure. Typically, most commands may be executed against the graph, which may provide the model portion of a data/view model. In this manner, the model portion is kept up-to-date. However, editing commands may be executed against the DOM, and at particular points (e.g., at the end of a word or paragraph), the DOM may update the graph structure with the revisions resulting from the user's edits. In this manner, the DOM and graph structure do not incur the performance penalty of tracking and processing each keystroke typed by the user, and instead aggregate keystrokes or commands for increased efficiency in processing.

The nodes within the graph structure may be updated in response to the commands 702, with only those nodes affected by the commands being updated. Once the affected notes are updated, the view code 408 may traverse these nodes and populate the DOM with, for example, appropriate HTML. In turn, the browser 124 may traverse the DOM and render the HTML for display to the user 126. In this manner, the browser 124 may enable the user 126 to visualize the results of any commands entered by the user.

In some instances, the browser 124 may determine whether to execute the commands locally at the browser, or remotely at the server. This determination may be made based upon performance considerations; typically, operations that are resource-intensive may be offloaded to the server. However, other factors for consideration may include a heavily loaded the server is at a given time.

The client-side revision store 406 may store a set of revisions that result from commands or other actions taken by the user through the browser 124. Beginning with a representation 408 of an initial state of the cells displayed in the browser, the revision store 406 may create and store a series of revision deltas 704. These revision deltas represent sequential, incremental changes that occur on the graph locally at the given browser 124. Among other functions, these revision deltas may provide a mechanism by which the browser may provide an "undo" function to the user, by which the user may step backwards through a set of revisions to return to some previous state.

The revision store 406 may store the revisions and revision deltas in, for example, one or more link lists, initially arranged in order of occurrence. However, over time such a linked list may become quite lengthy to traverse. Typically, most revisions of interest to the user (e.g., for "undo" operations) may be at the end of this linked list. However, accessing these revisions of interest may involve traversing the entire linked list, entailing a considerable performance penalty. In this situation, the revision store may reorganize the linked list of revision deltas, so that instead of the deltas looking "backwards" through the list to an earlier initial state, the deltas look "forwards" to a future state.

Although the revision store 406 may store deltas representing most or all of the revisions occurring at the local browser, the revision store 406 may or may not report all of these revisions over the network 128 to the server. For example, given a complete set of revision deltas 704 occurring locally on the browser, the revision store 406 may report some subset of these revision deltas (denoted at 706) to the replication manager 402. In turn, the replication manager may forward these revisions to the server, as carried forward at 504. More specifically, the replication manager within the browser may determine when to forward these revisions to the server, so as not to interfere unduly with user interactions occurring within the browser. Ultimately, the replication manager at a given browser may transfer to the server the aggregate or cumulative resulting changes that the user has made at that browser. The replication manager at the browser may combine the revisions and revision deltas occurring at the browser to define a resulting revision that mimics the aggregate or cumulative changes to the cell, thereby establishing a current state of the cell. In turn, the replication manager may send the current state of the cell up to the server.

Having described the browser-side components and data flows for processing revisions in FIG. 7, the discussion now turns to a description of server-side components and data flows for processing these revisions. This description is now provided with FIG. 8.

Figure 8:
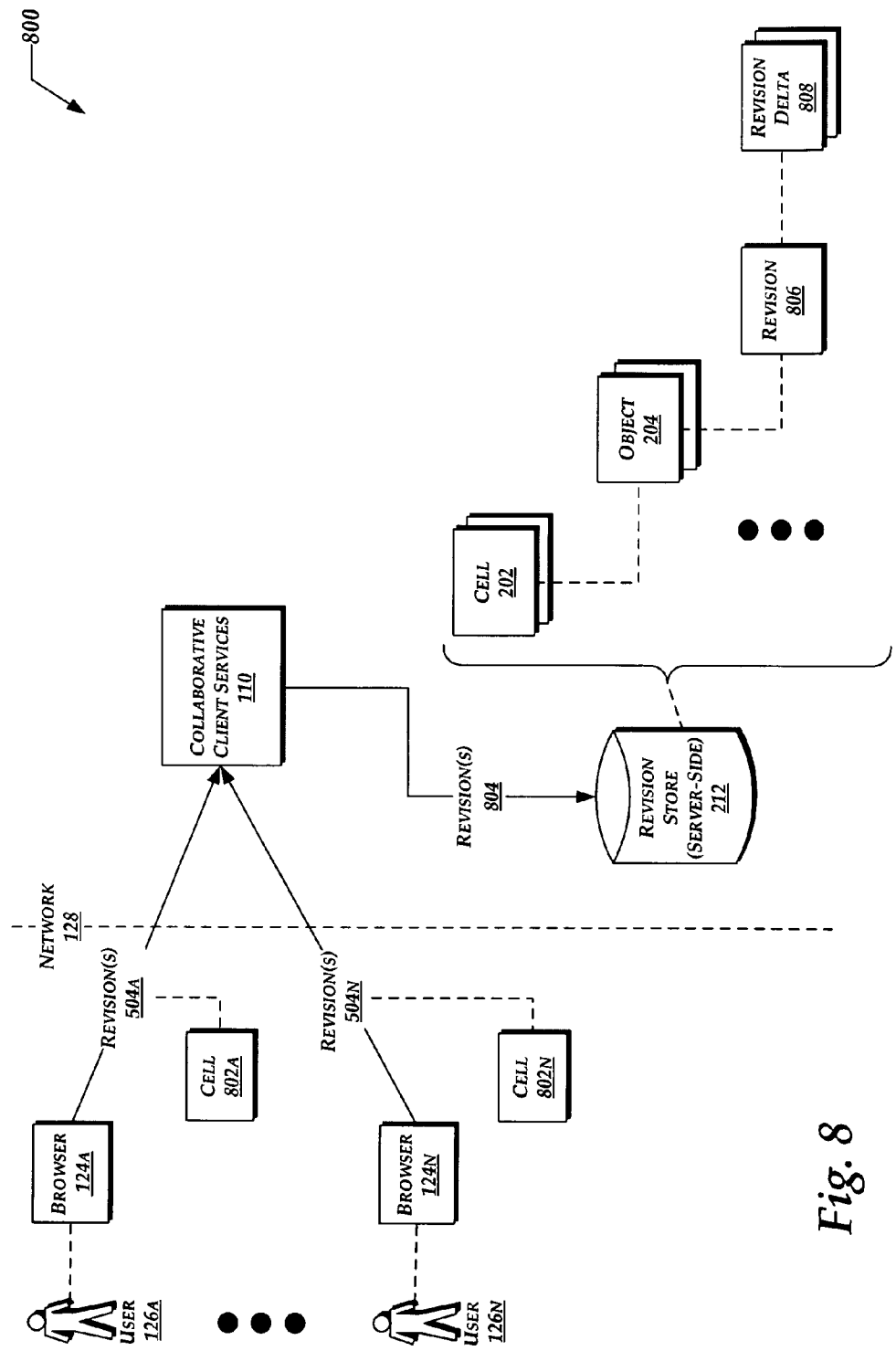
FIG. 8 is a combined block and flow diagram illustrating server-side components and data flows for receiving and processing revisions from browsers.

FIG. 8 illustrates server-side components and data flows, denoted generally at 800, for receiving and processing revisions from browsers. For ease of reference, but not limitation, FIG. 8 may carry forward some reference numbers from previous drawings to refer to similar items.

In the examples shown in FIG. 8, example users 126a and 126n may interact with example browsers 124a and 124n to create revisions 504a and 504n to particular cells 802a and 802n. In turn, the browsers 124a and 124n may report these revisions to the collaborative client services 110 over the network 128.

Having received these revisions from the browsers, the collaborative client services 110 may store these revisions in a server-side revision store (e.g., 212), as denoted generally at 804. FIG. 8 illustrates two browsers communicating revisions only for purposes of this discussion, but implementations of this description may include any number of browsers 124 that report revisions to the collaborative client services.

As described above in FIG. 2, the server-side revision store 212 may contain revisions of any number of cells, which in turn may contain one or more object representations 204. These object representations 204 may be associated with an initial revision 806, which indicates a state or status of a cell or object before the arrival of any revision notifications for that cell or object.

As notifications of revisions 504 arrive from the various browsers, these notifications may indicate which cells are being revised, as denoted respectively at 802a and 802n. When the collaborative client services 110 receive these notifications, these services may create and store revision deltas 808 on the server side. Functionally, these revision deltas 808 on the server side may operate similarly to the revision deltas described on the browser side. However, it is noted that the server-side revision deltas may or may not be exactly the same as the browser-side revision deltas.

Having described the server-side components and data flows for receiving and processing revisions from browsers in FIG. 8, the discussion now proceeds to a more detailed description of the server-side components. This description is now provided with FIG. 9.

Figure 9:
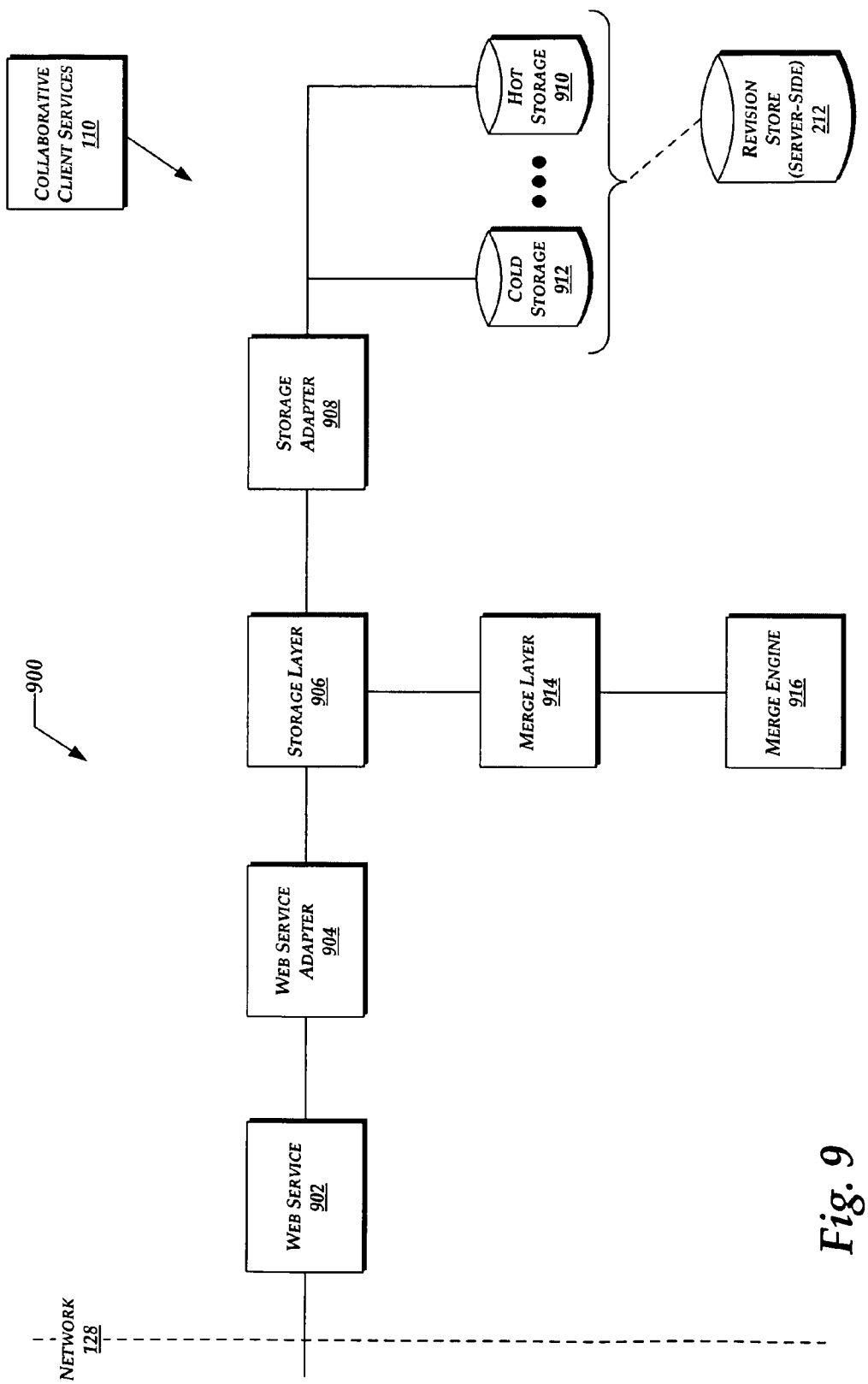
FIG. 9 is a block diagram illustrating server-side components for providing collaborative client services.

FIG. 9 illustrates server-side components, denoted generally at 900, associated with the collaborative client services. For ease of reference, but not limitation, FIG. 9 may carry forward some reference numbers from previous drawings to refer to similar items. For example, FIG. 9 carries forward an example of the collaborative client services 110 and an example of the network 128.

A Web service 902 is provided as an interface that receives communications from the browsers, and that directs these communications to the appropriate components within the collaborative client services. These communications may include, for example, notifications of revisions or revision deltas as received from a variety of different browsers collaborating on a given instance of content. These notifications may come from and/or to the various browsers. The Web service may provide adapters 904 that translate these communications from protocols suitable for transmission over the network 128 into internal binary protocols more suitable for processing within the collaborative client services.

The Web service may support methods or application program interfaces (APIs) for sending revisions to the browsers, receiving revisions from the browsers, or the like. In addition, these APIs may include methods that indicate to the server that a given browser has browsed away from a given page, and thus has completed editing any cells on that page.

A storage layer 906 may communicate through the Web service adapter 904, and may abstract communications to and/or from the server-side revision store 212. The storage layer 906 may also provide a storage adapter 908 that provides an interface to the server-side revision store. As revisions arrive from the various browsers, the storage layer 906 may cache these revisions in the revision store.

The server-side revision store may include different storage areas or caches having different characteristics. For example, a first storage area 910 may be adapted or configured to store smaller chunks of data that are accessed and revised more recently and more frequently. For ease of reference, but not to limit possible implementations, FIG. 9 denotes this first storage area as a "hot" storage area or cache. The revision store may also include a second storage area or cache 912 that is adapted or configured to store larger chunks of data that are accessed and revised less recently and less frequently. For ease of reference, but not to limit possible implementations, FIG. 9 denotes this second storage area as a "cold" storage area or cache.

A merge layer 914 and related merge engine 916 makes those interfaces and related methods that allow the storage layer to invoke merge capabilities. For example, as different browsers send to the collaborative client services revisions to given content, the storage layer may store corresponding revisions and/or revision deltas in the caches 910 and 912. When appropriate, the storage layer 906 may call the merge layer 914 to merge or reconcile these various revisions to update the content on which the browsers are collaborating. In addition, the merge layer 914 may determine when to invoke and run the merge engine 916, based on factors such as how heavily loaded or busy the servers providing the collaborative client services are at any given time.

In the foregoing processing, save operations become asynchronous to merge operations. Typically, on the browser side, the revision data may be highly serialized, while on the server side, the revision data may be reorganized and optimized so that it is not as serialized. Thus, the revision history as maintained by the servers may or may not be a linear representation indicating an order in which changes occurred on the browsers. Instead, the revision history may include branches or other non-linear characteristics.

Typically, users and browsers are shielded from the details of the merge process, such that delays in merging not overly impact the overall user experience. Put differently, users may continue with revisions at the browser, without waiting for merges to complete, or even being aware that merges are underway at the server end.

The collaborative client services 110 may use the architecture shown in FIG. 9 to perform several functions. These functions may include, but are not limited to, optimizing the payload of data transferred to and from the various browsers, determining the best environment in which to run commands issued from the browsers, optimizing storage of content and cells on the server, enabling multi-user editing of collaborative content, and the like. This discussion now provides further details on each of these functions.

Optimize Payload of Data

When opening a document or file for collaboration under the collaborative client services, the storage layer 906 may retrieve content for one or more appropriate pages within this file or document. The storage layer may fetch only the data for this page or pages from the server-side revision store. This fetch may be optimized to look for these pages first in the hot store (e.g., 910). If the three requested pages are not in the hot store, the fetch may incrementally search the cold store (e.g., 912).

The appropriate data is fetched from the revision store, stored in front-end caches on the server, and sent down to the appropriate browser (e.g., 124). The receiving browser may store this data in a browser-side revision store (e.g., 306), and re-create or rehydrate this data in a graph structure (e.g., 310). When a given user revises the content in a given browser, or if another user changes the content in another browser, the collaborative client services may generate revisions and revision deltas indicating these changes, and may send these revisions to other browsers collaborating on the content.

On the browser side, the browsers may handle revisions and revision deltas in the browser-side revision store, with the browsers creating the appropriate updates for the graph structure out of the revision store. On the server side, the collaborative client services may store these revisions and revision deltas in the hot store (e.g., 910). Afterwards, the collaborative client services may merge the revisions and revision deltas received from the different users. For example, the client services may run merge operations asynchronously of other operations, so as not to interfere unduly with these other operations (i.e., "quietly").

Other users or browsers may ask the server for any changes made to the collaborative content. In these cases, the server may retrieve these changes from caches maintained by front-end servers, or the front- and servers may retrieve these changes may backend server. In general, the collaborative client services may provide opportunistic hot-store caching, by allowing front-end servers to store locally data that the front ends had previously fetched, and to return this data to a requesting browser without going to the backend server. The collaborative client services may also provide redirection to cache, where one front-end server may redirect a request from a browser to another front-end server, in cases where the latter front- and server contains the cached data that the browser is requesting.

Running Commands in the Appropriate Environment

The collaborative client services may execute a number of commands in the browser, without interaction with or intervention by the server. The browser may execute these commands by combinations of manipulating the DOM (e.g., 316) and by performing operations on the graph structure (e.g., 310). Some commands may run on the server, however, because the server may provide the performance capacity to run these commands, and because running commands on the server does not involve downloading code (and confidential and/or sensitive information) to the remote browsers.

In addition, those commands that run on the server may do so without otherwise interfering with the "normal" operation of the server. For example, when the storage layer 906 receives a new change, it may pass it on to the server-side revision store 212 for storage. The storage layer may also notify the merge layer 914 of this new change. Asynchronously to this notification, however, the merge layer may attempt to merge this new content, when appropriate. This asynchronous operation may minimize the risk of overloading the server so that it is too busy to handle other requests. In this matter, the merge layer may operate only if the front-end server has enough free cycles to devote to the merge.

Commands such as paste may run in a combination of browser and server. The browser may include logic that detects that the processing involved in performing a sufficient paste operation is too complicated to be performed locally at the browser, and may instead ask the server to do perform this operation. Again, the code running on the server may schedule and perform this paste operation so as not to interfere unduly with other operations performed on the server.

Server Storage

When collaborative content (e.g., cells) is to be stored, this content may move from the browser to a front-end server, and ultimately to the storage layer. The storage layer may communicate with the server-side revision store, and may store the cells in two different locations., relatively small changes that occurred more recently may be stored in a faster, more expensive hot store (e.g., 910): this optimizes retrieving this small set of data to pass it to other users, instead of having to retrieve data from a slower, more expensive cold store (e.g., 912). Once revisions or changes are consolidated or merged into the main file, the main file may be stored in the cold store. This optimizes cost by storing the main file, which is typically relatively large, into a store that is cheaper than the hot store.

When browsers request particular cells within a file, the storage layer and the file provider may retrieve the requested revisions from one or both of these stores (i.e., the hot store and the cold store), and may present the revisions as unified data to the browsers and the rest of the server-side components. The storage layer may also translate user content stored on servers into content that is consumable by the browser, while expanding certain nodes within the content, and not downloading content that the browser does not use.

Multi-User Editing

The data model employed by the collaborative client services may include revisions, as described above. The client services may also load/save these revisions without express user interaction (i.e., "behind the scenes"). This approach may automatically propagate changes from users, optimizing both how user content and revisions are shared (i.e., by putting the minimum burden on the wire), and when such content and revisions are shared. In this manner, the collaborative client services may synchronize changes from a given user to all other browsers much faster, once the client services detect that multiple users are collaborating on given content.

The collaborative client services may transform the data model so as to allow the browsers and servers to process the data efficiently. The browser made then display and process the appropriate content. In addition, the collaborative client services may integrate with electronic notebook applications (e.g., including but not limited to the OneNote™ product available from Microsoft Corporation of Redmond, Wash.). For example, the storage layer may change the format of the revisions so that they can be stored in a format that is compatible with electronic notebook applications. In this manner, the collaborative client services may seamlessly integrate with rich clients, and may utilize widely-available browsers while relying on the electronic notebook application (or other software products or applications) to provide a richer user experience.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for web-based multiuser collaboration, the method comprising executing instructions in one or more computer systems to perform the operations of:
   modeling a document on a server into semantic pieces as a plurality of cells for a construct of the document;
   identifying at least one cell of interest of the plurality of cells to at least one user of a plurality of users, the at least one cell of interest comprising a portion of the document cached on the server;
   in response to identifying the at least one cell of interest, sending the cached portion of the at least one cell of interest to a browser associated with the at least one user;
   associating the at least one cell of interest with the at least one user;
   storing an association between the at least one cell of interest and the at least one user;
   obtaining a first revision of interest to the at least one cell of interest;
   determining, based upon the association between the at least one cell of interest and the at least one user, that the first revision of interest is to be sent to the browser associated with the at least one user; and
   sending a cached portion of the first revision of interest to the browser associated with the at least one user, whereby the cached portion of the first revision is configured to be displayed by the browser along with a first identifier indicating the association between the at least one cell of interest and the at least one user.

2. The computer-implemented method of claim 1, further comprising:
   determining that a second user is collaborating on the at least one cell of interest; and
   in response to determining that the second user is collaborating on the at least one cell of interest, send a representation of the first revision to at least a second browser associated with the second user.

3. The computer-implemented method of claim 1, further comprising:
   receiving from the browser a representation of a second revision to the at least one cell of interest; and
   merging the first revision and the second revision to the at least one cell of interest.

4. The computer-implemented method of claim 1, further comprising:
   retrieving from the cache the at least one cell of interest; and
   sending a representation of the at least one cell of interest from the cache to at least a second browser associated with a second user.

5. The computer-implemented method of claim 1, further comprising:
   receiving a request for the at least one cell of interest; and
   redirecting the request to the cache.

6. The computer-implemented method of claim 1, wherein identifying the at least one cell of interest to the at least one user of the plurality of users include:
   sending names of pages of the document to the browser associated with the at least one user of the plurality of users, along with a content of a first page of the document; and receiving a selection of a name of a page of the document from the browser associated with the at least one user of the plurality of users.

7. The computer-implemented method of claim 1, further comprising providing a number of look-ahead pages and a number of look-behind pages occurring before and after, respectively, the at least one cell of interest.

8. The computer-implemented method of claim 1, wherein modeling the document as the plurality of cells further comprises:
   modeling the document as a graph data structure; and
   providing a semantic model of the document, the semantic model providing a hierarchy for the document.

9. The computer-implemented method of claim 8, wherein the graph data structure comprises a directed acyclic graph comprising one or more types of nodes, property sets, and other elements representing the plurality of cells.

10. The computer-implemented method of claim 9, wherein the at least one cell of interest of the plurality of cells is represented as at least one node of the directed acyclic graph of the graph data structure.

11. A system for web-based multiuser collaboration, the system comprising:
   a processor; and
   an optical disk, magnetic storage device, or semiconductor storage device having executable instructions stored thereupon which, when executed by the processor, cause the processor to
      model a document on a server into semantic pieces as a plurality of cells for a construct of the document,
      identify at least one cell of interest of the plurality of cells to at least one user of a plurality of users, the at least one cell of interest comprising a portion of the document cached on the server,
      in response to identifying the at least one cell of interest, send the cached portion of the at least one cell of interest to a browser associated with the at least one user,
      associate the at least one cell of interest with the at least one user,
      store an association between the at least one cell of interest and the at least one user,
      obtain a first revision of interest to the at least one cell of interest,
      determine, based upon the association between the at least one cell of interest and the at least one user, that the first revision of interest is to be sent to the browser associated with the at least one user, and
      send a cached portion of the first revision of interest to the browser associated with the at least one user, whereby the cached portion of the first revision is configured to be displayed by the browser along with a first identifier indicating the association between the at least one cell of interest and the at least one user.

12. The system of claim 11, wherein the optical disk, magnetic storage device, or semiconductor storage device contains further instructions which, when executed by the processor, further causes the processor to:
   determine that a second user is collaborating on the at least one cell of interest; and
   in response to determining that the second user is collaborating on the at least one cell of interest, send a representation of the first revision to at least a second browser associated with the second user.

13. The system of claim 11, wherein the optical disk, magnetic storage device, or semiconductor storage device contains further instructions which, when executed by the processor, further causes the processor to:
   retrieve from the cache the at least one cell of interest; and
   send a representation of the at least one cell of interest from the cache to at least a second browser associated with a second user.

14. The system of claim 11, wherein the optical disk, magnetic storage device, or semiconductor storage device contains further instructions which, when executed by the processor, further causes the processor to:
   receive a request for the at least one cell of interest; and
   redirect the request to the cache.

15. The system of claim 11, wherein identifying the at least one cell of interest to the at least one user of the plurality of users includes:
   sending names of pages of the document to the browser associated with the at least one user of the plurality of users, along with a content of a first page of the document; and
   receiving a selection of a name of a page of the document from the browser associated with the at least one user of the plurality of users.

16. An optical, magnetic, or semiconductor computer-readable storage medium having instructions stored thereon which, when executed by a processor of a computing system, cause the computing system to perform operations comprising:
   modeling a document on a server into semantic pieces as a plurality of cells for a construct of the document;
   identifying at least one cell of interest of the plurality of cells to at least one user of a plurality of users, the at least one cell of interest comprising a portion of the document cached on the server;
   in response to identifying the at least one cell of interest, sending the cached portion of the at least one cell of interest to a browser associated with the at least one user;
   associating the at least one cell of interest with the at least one user;
   storing an association between the at least one cell of interest and the at least one user;
   obtaining a first revision of interest to the at least one cell of interest;
   determining, based upon the association between the at least one cell of interest and the at least one user, that the first revision of interest is to be sent to the browser associated with the at least one user; and
   sending a cached portion of the first revision of interest to the browser associated with the at least one user, whereby the cached portion of the first revision is displayed by the browser along with a first identifier indicating the association between the at least one cell of interest and the at least one user.

17. The optical, magnetic, or semiconductor computer-readable storage medium of claim 16, comprising further computer-readable instructions which, when executed by the computing system, cause the computing system to convert the cached portion of the document to or from at least one format associated with a client application.

18. The optical, magnetic, or semiconductor computer-readable storage medium of claim 16, wherein identifying the at least one cell of interest to the at least one user of the plurality of users comprises:
   sending names of pages of the document to the browser associated with the at least one user of the plurality of users, along with a content of a first page of the document; and receiving a selection of a name of a page of the document from the browser associated with the at least one user of the plurality of users.

19. The optical, magnetic, or semiconductor computer-readable storage medium of claim 16, wherein modeling the document as the plurality of cells further comprises:
    modeling the document as a graph data structure; and
    providing a semantic model of the document, the semantic model providing a hierarchy for the document.

20. The optical, magnetic, or semiconductor computer-readable storage medium of claim 19, wherein the graph data structure comprises a directed acyclic graph comprising one or more types of nodes, property sets, and other elements representing the plurality of cells.

* * * * *